Dec. 27, 1966   R. G. SMITH   3,294,408
AUXILIARY, EXTERNAL, PRESSURE SEAL FOR SHANK OF PLUG VALVE
Original Filed April 22, 1963   3 Sheets-Sheet 1
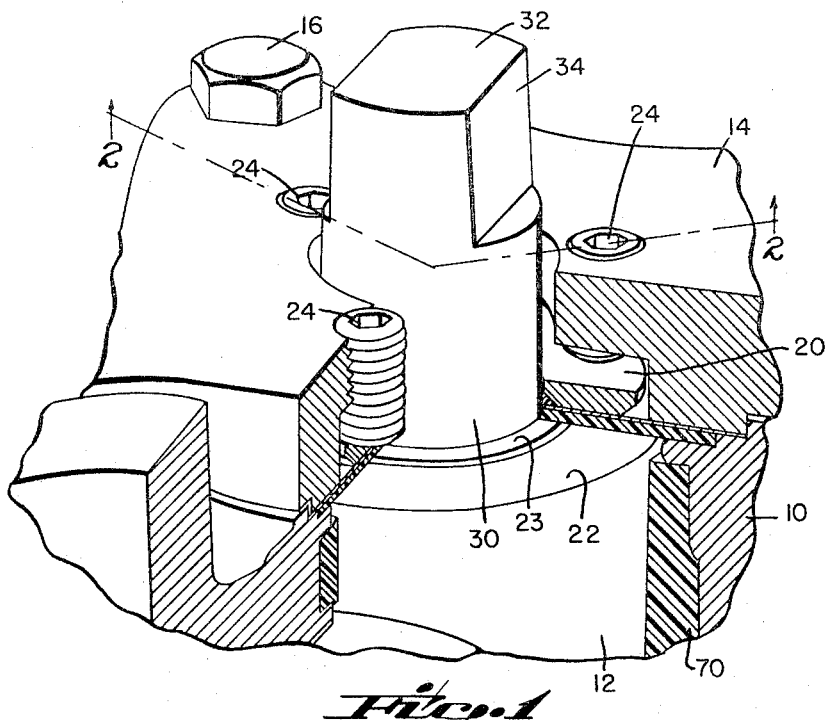
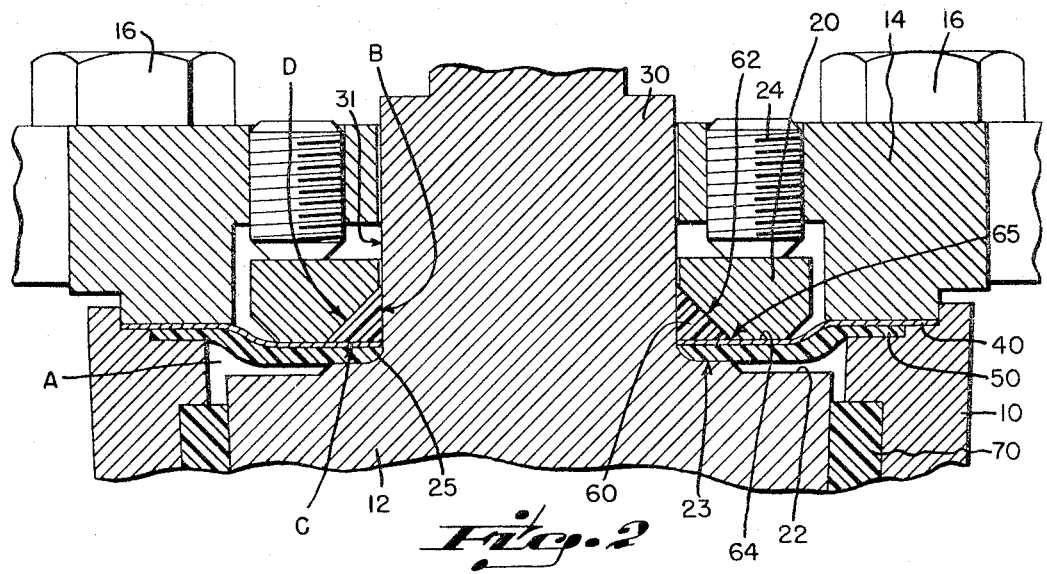
INVENTOR.
RUSSELL G. SMITH
BY
*J. Warren Kinney Jr.*
ATTORNEY

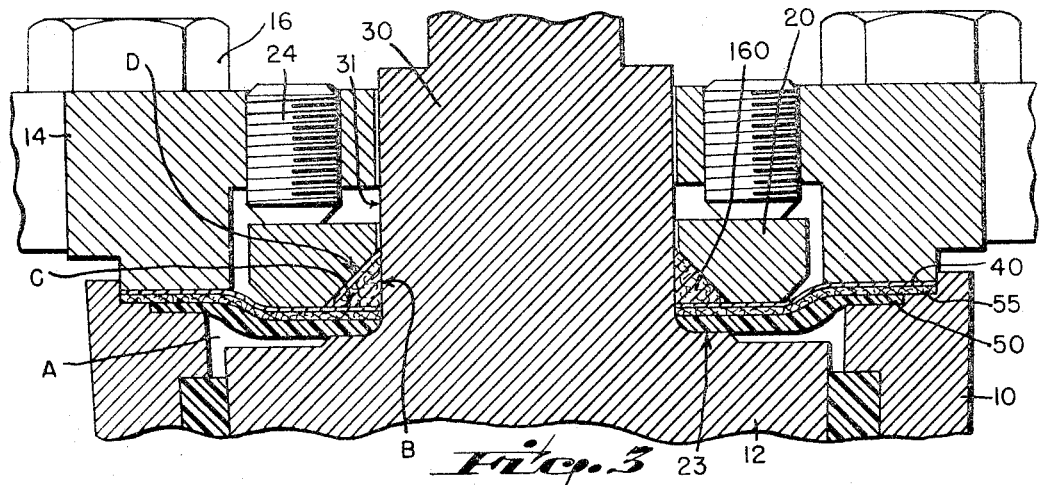
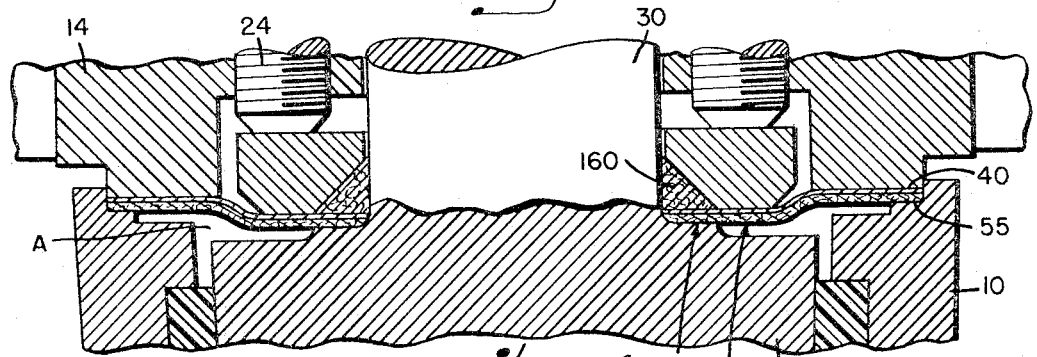
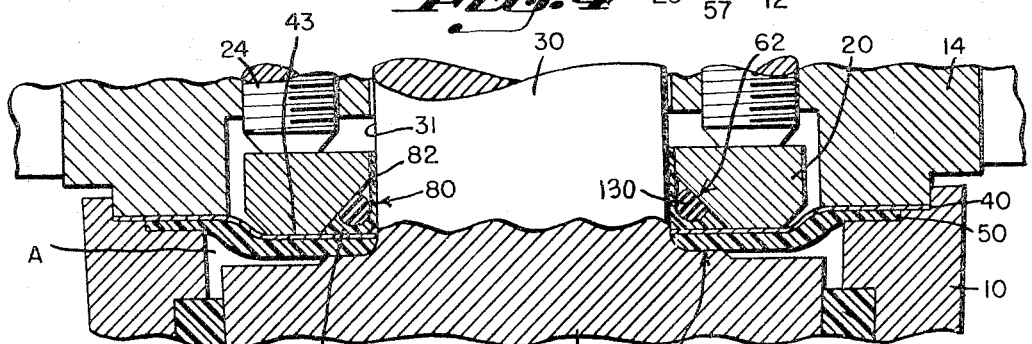
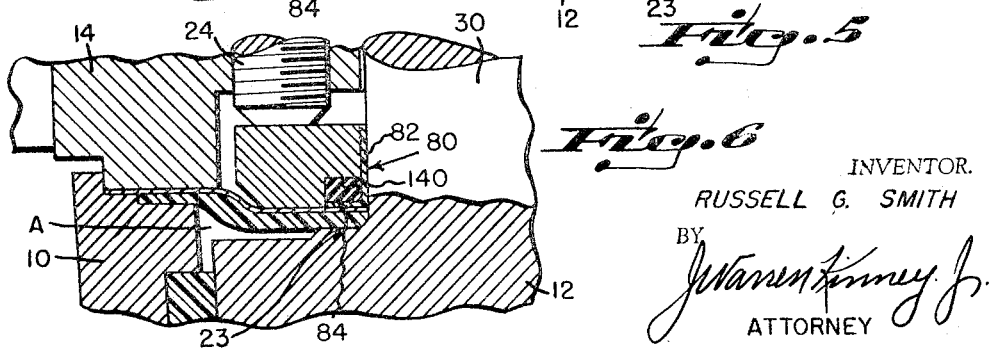

Dec. 27, 1966  R. G. SMITH  3,294,408
AUXILIARY, EXTERNAL, PRESSURE SEAL FOR SHANK OF PLUG VALVE
Original Filed April 22, 1963  3 Sheets-Sheet 3
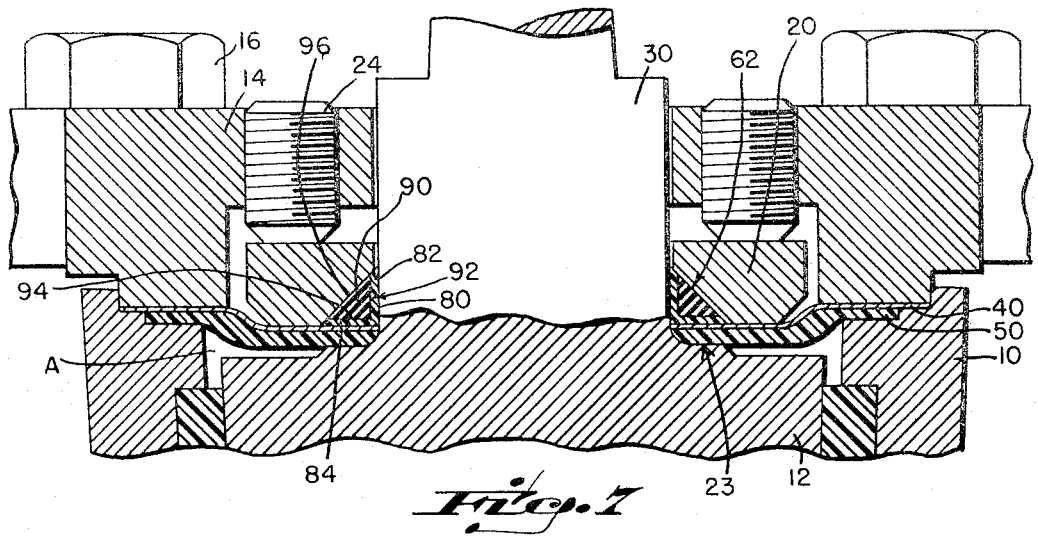
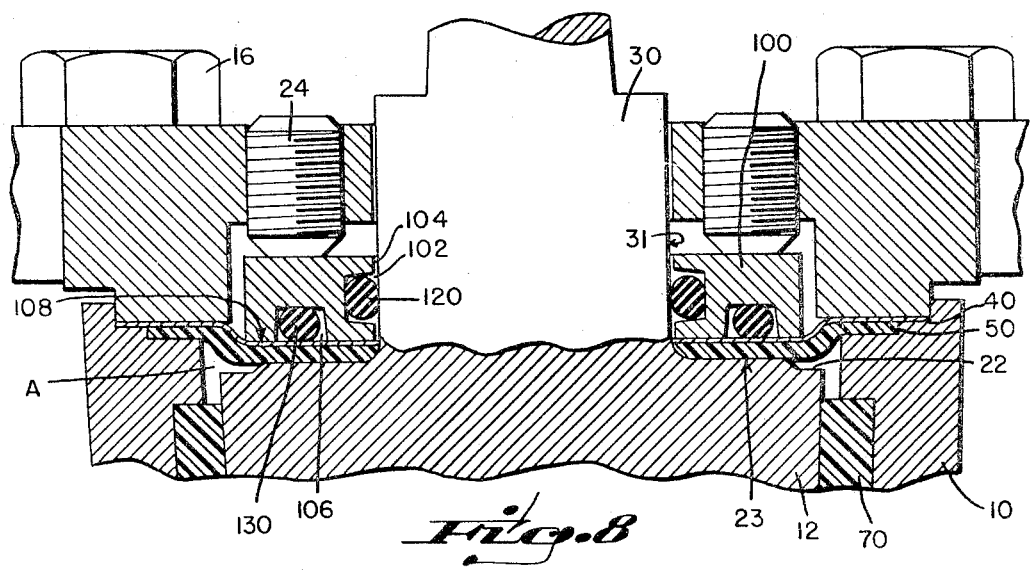
INVENTOR.
RUSSELL G. SMITH
BY
ATTORNEY United States Patent Office 3,294,408
Patented Dec. 27, 1966

3,294,408
AUXILIARY, EXTERNAL, PRESSURE SEAL
FOR SHANK OF PLUG VALVE
Russell G. Smith, Cincinnati, Ohio, assignor to Continental Manufacturing Company, Cincinnati, Ohio, a corporation of Ohio
Original application Apr. 22, 1963, Ser. No. 274,614, now Patent No. 3,235,272, dated Feb. 15, 1966. Divided and this application Aug. 2, 1965, Ser. No. 476,273
4 Claims. (Cl. 277—58)

This is a division of my patent application, S.N. 274,614 filed April 22, 1963, now Patent No. 3,235,272, issued February 15, 1966.

A primary object of the invention is to provide a positive leakage seal to the atmosphere, and in particular to provide a simple yet extremely effective and highly efficient external seal for that portion of the plug shank immediately above and adjacent the diaphragm seal at the upper end of a plug valve.

Another object of the invention is to provide sealing means exteriorly of the shank of a plug which means are adapted to cooperate with and augment the conventional "interior" seal at the upper end of a plug.

A further object of the invention is to provide sealing means which are indestructable and which remain fully operative even when subjected to temperatures sufficient to cause vaporization and dissipation of conventional sealing media such as, by way of example, plastic sealing material from the group consisting of polyethylene and its halogen substitute products.

Still a further object of the invention is to provide auxiliary sealing means to establish a positive leakage seal to the atmosphere, which may be associated with a standard or conventional plug valve without requiring modification thereof.

These and other objects are attained by the means described herein and as disclosed in the accompanying drawings in which:

FIG. 1 is a prospective view of the upper portion of a typical plug valve, with parts being broken away for illustrating certain details of the present invention.

FIG. 2 is a sectional view taken on line 2—2 of FIG. 1.

FIG. 3 is a sectional view similar to FIG. 2 wherein the sealing means includes a sealing ring and an additional diaphragm each of which is formed from a heat resistant material such as, by way of example, asbestos, or the like.

FIG. 4 is a view similar to FIG. 3 showing the relationship of the valve parts as they will exist after the conventional plastic diaphragm has been dissipated such as, by way of example, the heat of a fire.

FIG. 5 is a view similar to FIG. 2 but illustrating a modified form of shank seal.

FIG. 6 is a view similar to FIG. 5 illustrating a modification thereof.

FIG. 7 is a view similar to FIG. 5 showing a further modification thereof.

FIG. 8 is a view similar to FIG. 2 illustrating an additional modified form of shank seal.

With reference now to the drawings, the numeral 10 denotes the body, 12 the rotatable plug and 14 a cover plate which is secured to and carried by the body by means of bolts 16.

A floating thrust collar, or gland 20 is interposed between portions of cover plate 14 and the upper end 22 of plug 12; said thrust collar being urged downwardly toward the upper end of the plug means by a plurality of set screws 24 which extend through and threadably engage the cover plate, as illustrated. In passing it should be noted that the thrust collar illustrated is centered by shank 30 of plug 12 whereby to effectively and automatically compensate for any misalignment. This construction is in contrast with a conventional gland of the type which, being threadably engaged by a valve cover, cannot compensate for plug and/or shank misalignment.

The numeral 30 denotes the shank of plug 12, said shank being circular in cross section, projecting upwardly from upper end 22 of the plug, and terminating in a free outer end 32 which may be provided with flats 34 to receive a suitable wrench, handle, or the like, not illustrated, for enabling an operator to impart a turning torque to the plug.

With particular reference now to FIG. 2 it will be noted that the upper end 22 of plug 12 is provided with a raised shoulder 23 which extends radially from the lower end of shank 30 via fillet or transition zone 25.

The numeral 40 denotes a first, or metallic diaphragm and the numeral 50 a second, non-metallic diaphragm which diaphragms are provided with outer portions which are clampingly engaged by and between adjacent portions of cover plate 14 and the upper end of body 10 incident to the tightening of bolts 16.

Each diaphragm 40 and 50 is provided with a central aperture dimensioned to snugly receive and circumscribingly abut shank 30 in said fillet adjacent to the shoulder 23 to be supported by the latter.

Diaphragm 40 denotes what will hereinafter be referred to as the diaphragm seal disc at the top of a plug valve. Such a diaphragm seal disc is metallic and conventional in the plug valve art. This diaphragm seal disc 40 and diaphragm 50 form a laminate assembly engaging the shank and extending therefrom and supported on the top of the body 10.

The auxiliary, external pressure seal of the present invention may comprise a sealing ring or member 60 having surfaces which selectively abut against adjacent surfaces of the shank 30, the upper or outer surface of diaphragm disc 40 and the inclined surface 62 of thrust collar 20. When the aforesaid surfaces of ring 60 have been disposed in positive, contacting sealing relationship with the aforesaid surfaces of the shank, diaphragm disc and thrust collar a positive external pressure seal will be provided which will effectively preclude leakage to the atmosphere of whatever media is being handled by the valve from the valve interior A along shank 30.

Uniformly satisfactory results have been obtained in those instances in which seal 60 is fabricated from a non-metallic plastic-material like or similar to that from which the second diaphragm 50 is fabricated.

With further reference to FIG. 2 it will be noted that sealing ring 60 approximates a right triangle, in vertical cross section, having a substantially vertical leg B, a substantially horizontal lower leg C and a third inclined leg D, comprising the hypotenuse. Inclined surface 62 of the thrust collar 20 is in substantial axial parallelism with leg D of seal 60; whereas lower surface 64 of the collar is in parallelism with lower leg C.

When thrust collar 20 is advanced downwardly toward the upper end of plug 12, lower face 64 of the collar will abut against a portion of the upper axial face of the first or diaphragm seal disc 40 at the top of the valve forcing said diaphragm disc downwardly against the second diaphragm 50 whose lower surface is thereby disposed in abutting relationship with shoulder 23 of the plug.

At the same time the outer surface of the lower leg C of seal ring 60 will be forced into abutting relationship with the upper surface of the first diaphragm 40 between the outer surface 31 of shank 30 and the inner edge 65 of the lower face 64 of collar 20; and surface B of the sealing ring will be forced into abutting relationship with and tightly against those portions 31 of shank 30 immediately above the first diaphragm 40.

The numeral 70 denotes generally a sleeve or liner which in some instances may be disposed between the valving surfaces of plug 12 and body 10; however, it should be understood that the external sealing means of the invention, heretofore described, may be utilized with plug valves whether they be lined or unlined and/or whether they be of the lubricated or non-lubricated type.

In FIG. 3 the seal ring 60 of FIGS. 1 and 2 has been replaced with a seal ring 160 of a heat resistant material such as, by way of example, asbestos, or the like. Seal ring 160 is similar in shape and function to its counterpart 60 of FIG. 2 insofar as its sealing relationship with respect to shank 30, diaphragm disc 40 and collar 20 are concerned.

The structure of FIG. 3 further differs from that of FIG. 2 by reason of the presence of a third diaphragm 55 which is interposed between the first and second diaphragms 40 and 50 respectively. Uniformly satisfactory results have been obtained in those instances wherein the third diaphragm is fabricated from heat resistant material similar to that of sealing ring 160.

FIG. 3 illustrates the normal relationship of the various sealing elements of the seal assembly of a valve when said valve is subjected to normal operating conditions.

FIG. 4 illustrates the relationship of the various sealing elements of the valve seal assembly of FIG. 3 as they will exist, and be positioned after and in the event that the second, or plastic diaphragm 50 has been dissipated such as, by way of example, will occur in the event that the valve should be subjected to the high temperatures of a fire. It should be noted that pressure within the valve body will cause the plug 12 to be shifted upwardly relative to body 10 and the other structural elements of the valve, whereby raised shoulder 23 will be urged upwardly toward and in contacting relationship with portions of lower surface 57 of the third diaphragm 55, for thereby producing and maintaining a positive, effective seal precluding the dissipation or passage of fluid media therefrom via shank 30 in the event that the plastic sealing elements of the valve should be dissipated.

With reference now to each of FIGS. 5, 6 and 7 it will be noted that a substantially L-shaped seal ring denoted generally by the numeral 80 and having an inner, upstanding substantially vertical leg 82 and a lower substantially horizontal leg 84 is provided between surface 31 of shank 30 of the plug and the shank-adjacent upper surface 43 of the first diaphragm 40.

In FIG. 5 the numeral 130 represents a sealing ring in the form of an O-ring which is received within and between the area defined by the intersection of legs 82 and 84, and in such a manner as to be engaged by inclined surface 62 of gland or collar 20.

In FIG. 6 a substantially rectangular O-ring 140 has been illustrated with portions thereof received between and disposed in abutting relationship with the inner portions of legs 82 and 84 of ring 80.

In FIG. 7 the numeral 90 represents a sealing ring having a substantially right-triangular cross section and having a substantially vertical inner surface 92, a substantially horizontal lower surface 94 and an inclined surface 96. Surfaces 92 and 94 are adapted to abutingly engage the adjacent surface of vertical leg 82 and horizontal leg 84 of the L-shaped sealing member 80, whereas inclined surface 96 is adapted to be engaged by inclined surface 62 of the gland or collar 20.

Uniformly satisfactory results have been obtained in those instances wherein the L-shaped sealing members 80 have been fabricated from plastic material of the group consisting of polyethylene and its halogen substitute product characterized by high anti-frictional properties and which are substantially resistant to corrosives and solvents such as by way of example, Teflon.

Sealing members such as 130, 140 and 90 may be fabricated from a substance such as, by way of example, synthetic rubber which is characterized by its greater resiliance and ability to rapidly return to its original dimensions if and when released from compressive force, than, say Teflon.

In the modifications illustrated in FIGS. 5, 6 and 7 the sealing members 130, 140 and 90 are utilized, by reason of their inherent resiliance and ability to uniformly transmit compressive forces to the adjacent surfaces of the legs 82 and 84 of the L-shaped seal members 80, the outer surfaces of which latter members are thereby urged against and maintained in postive abutting relationship with portions of the diaphragm seal assembly at the top of the valve and shank 30 of plug 12.

In FIG. 8 the numeral 100 indicates a rigid seal ring which has been provided with a first annular recess 102 in the inner, upstanding face 104, and a second annular recess 106 in the bottom surface 108. An O-ring 120 is receivable within annular recess 102 and an O-ring 130 is receivable within annular recess 106, whereby O-ring 120 will be disposed in abutting-sealing relationship with the outer surface 13 of shank 30 and O-ring will be disposed in abutting-sealing relationship with portions of the diaphragm seal disc 40 at the top of the valve.

From the foregoing it will be noted that I have provided simple yet highly effective external, pressure sealing means for preventing leakage to the atmosphere via seepage around the shank of a valve plug.

It should be understood that various changes and modifications may be made, in the structural details of the device within the scope of the appended claims, without departing from the spirit of the invention.

What is claimed is:

1. In a rotary plug valve assembly of the type which includes a rotary plug having a shank extending from the top thereof, a thrust collar intermediate a cover plate secured to and carried by the valve body at a location beyond the upper end of the plug and having the shank extending therethrough, said thrust collar and cover plate having apertures dimensioned to loosely receive the plug shank, a first diaphragm a second diaphragm and a third diaphragm each having outer portions, means securing the outer portions of said diaphragms between the cover plate and body, said diaphragms each having a central aperture dimensioned to snugly receive and circumscribingly abut the plug shank closely adjacent to the top of the plug, external sealing means interposed between and engaging adjacent portions of the said thrust collar, the first diaphragm and the shank for providing a secondary seal between the first diaphragm and shank at a location external of said first diaphragm, said third diaphragm being interposed between said first and second diaphragms, and wherein the first diaphragm is formed of metal, the second diaphragm is formed of a plastic material from the group consisting of polyethylene and its halogen substitute products characterized by high anti-frictional properties and resistance to corrosives and solvents, and wherein the third diaphragm and the external sealing means are formed from a heat and fire resistant material.

2. A rotary plug valve assembly, comprising a valve body, a cover plate secured thereon, a rotary plug in the body having a top end, a shank extending from said top end through an aperture in said plate, said plug top end having a flat surface which extends radially from and merges with the lower end of the shank by a transition fillet, an annular diaphragm seal assembly comprising at least two diaphragm discs in superimposed relation, the uppermost disc being of metal and the underlying one being nonmetallic, said assembly encircling said shank and resting adjacent to its center upon said flat surface of the plug and bearing snugly at its inner edge in said fillet, said diaphragm seal assembly being peripherally secured between the body and the cover plate, a rigid annular collar encircling the shank and having a relatively wide bottom surface overlying and bearing upon an area of the said diaphragm seal assembly and having a vertical inner surface closely opposing the shank, said bottom and inner surfaces of said collar terminating short of intersection with one another and thereby forming an annular seal receiving space around the shank, an annular compressible seal unit in said annular seal receiving space and having an upstanding inner surface engaging the shank of the plug and a second surface normal to said first surface and extending outwardly from the lower portion thereof and engaging a portion of the top side of the said diaphragm seal assembly closely adjacent to the plug and shank, and means for driving said rigid annular collar toward said top of the plug body and thereby imposing thrust against said annular seal unit and compressing the latter against said diaphragm seal assembly and against said shank to effectively prevent passage of fluid from within the valve body along the top and side surfaces of the plug and shank respectively between said rigid collar and the diaphragm seal assembly, the bearing area of said bottom surface of said collar upon the diaphragm seal assembly being radially outwardly of the seal unit and the diaphragm seal assembly below said collar bottom surface being vertically spaced from the top end of the rotary plug.

3. A rotary plug valve assembly, comprising a valve body, a cover plate secured thereon, a rotary plug in the body having a top end, a shank extending from said top end through an aperture in said plate, said plug top end having a relatively wide raised shoulder which has a substantially flat top surface which encircles and extends radially from and merges with the lower end of the shank by a transition fillet, said raised shoulder terminating substantially radially inwardly of the outer side of the plug top, an annular diaphragm seal assembly encircling said shank and resting adjacent to the center thereof upon said substantially flat top surface of said raised shoulder and having an inner edge conforming to and fitting in said fillet, said diaphragm seal assembly being peripherally secured between the body and the cover plate, a rigid annular collar encircling the shank and having a relatively wide bottom surface overlying and bearing upon the said diaphragm seal assembly radially outwardly of said raised shoulder and having an upstanding inner surface opposing the shank, said bottom and inner surfaces of said collar terminating short of intersection with one another and thereby forming an annular seal receiving space around the shank, an annular compressible seal unit in said annular seal receiving space and having a substantially vertical inner surface engaging the shank of the plug and a second surface normal to said first surface and extending outwardly from the lower portion thereof and engaging a portion of the top side of the said diaphragm seal assembly closely adjacent to the plug and shank and overlying a major portion of only said raised shoulder, and means for driving said rigid annular collar toward said top of the plug body and thereby imposing thrust against said annular seal unit and compressing the latter against said diaphragm seal assembly and shank to effectively prevent passage of fluid from within the valve body along the top and side surfaces of the plug and shank respectively between said rigid collar and the diaphragm seal means.

4. The invention according to claim 2, wherein said annular compressible seal means is a one-piece preformed unit.

References Cited by the Examiner
UNITED STATES PATENTS

| | | | |
|---|---|---|---|
| 1,205,887 | 11/1916 | Guttner | 277—125 |
| 2,702,686 | 2/1955 | Fortune | 251—335.1 |
| 2,876,987 | 3/1959 | Renfro | 251—335.1 X |
| 2,926,884 | 3/1960 | Clinkenbeard | 251—309 X |
| 3,004,783 | 10/1961 | Webb | 277—124 X |
| 3,030,067 | 4/1962 | Manor | 251—214 |
| 3,094,335 | 6/1963 | Shenk | 277—5 |
| 3,132,838 | 5/1964 | Smith | 251—214 |
| 3,157,381 | 11/1964 | Floyd | 251—214 |

SAMUEL ROTHBERG, *Primary Examiner.*

LAVERNE D. GEIGER, *Examiner.*

J. MEDNICK, *Assistant Examiner.*